US006812695B2

United States Patent
Landrieve

(10) Patent No.: US 6,812,695 B2
(45) Date of Patent: Nov. 2, 2004

(54) DEVICE FOR DETECTING ANGULAR DISPLACEMENT AND INSTRUMENTED ROLLER BEARING

(75) Inventor: Franck Landrieve, Fondettes (FR)

(73) Assignee: SKF France, Montigny le Bretonneux (FR)

( * ) Notice: Subject to any disclaimer, the term of this patent is extended or adjusted under 35 U.S.C. 154(b) by 0 days.

(21) Appl. No.: 10/257,668

(22) PCT Filed: Apr. 6, 2001

(86) PCT No.: PCT/FR01/01055

§ 371 (c)(1),
(2), (4) Date: Jul. 7, 2003

(87) PCT Pub. No.: WO01/79860

PCT Pub. Date: Oct. 25, 2001

(65) Prior Publication Data

US 2004/0003665 A1 Jan. 8, 2004

(30) Foreign Application Priority Data

Apr. 12, 2000 (FR) .......................... 00 04731

(51) Int. Cl.$^7$ ................................ G01B 7/30
(52) U.S. Cl. .................. 324/207.25; 324/207.11; 384/448
(58) Field of Search ............... 324/207.11, 207.23, 324/207.25; 384/445, 448, 490

(56) References Cited

U.S. PATENT DOCUMENTS

| 3,998,298 A | 12/1976 | Fleagle |
| 5,121,054 A | 6/1992 | Phillips et al. |
| 6,232,772 B1 * | 5/2001 | Liatard et al. ......... 324/207.25 |

FOREIGN PATENT DOCUMENTS

EP 0 814 338 A1 12/1997

* cited by examiner

Primary Examiner—Bot Ledynh
(74) Attorney, Agent, or Firm—Young & Thompson

(57) ABSTRACT

A device for detecting one or more parameters of a rotary member angular displacement, includes: and instrumented roller bearing (1) provided with a non-rotating part including a non-rotating ring (2) and a sensor block (8), a rotating part including a rotating ring (2) and a coding ring (15) mounted opposite the sensor block (8) and at least a row of rolling elements (4); and elements for processing signals transmitted by the sensor block. The sensor block (8) comprises at least two sensing elements (9, 10) co-operating with the single coding ring, signals transmitted independently by each sensing element corresponding to the same parameter of angular displacement, so as to supply to the processing elements a redundant information on the parameter of angular displacement.

16 Claims, 1 Drawing Sheet

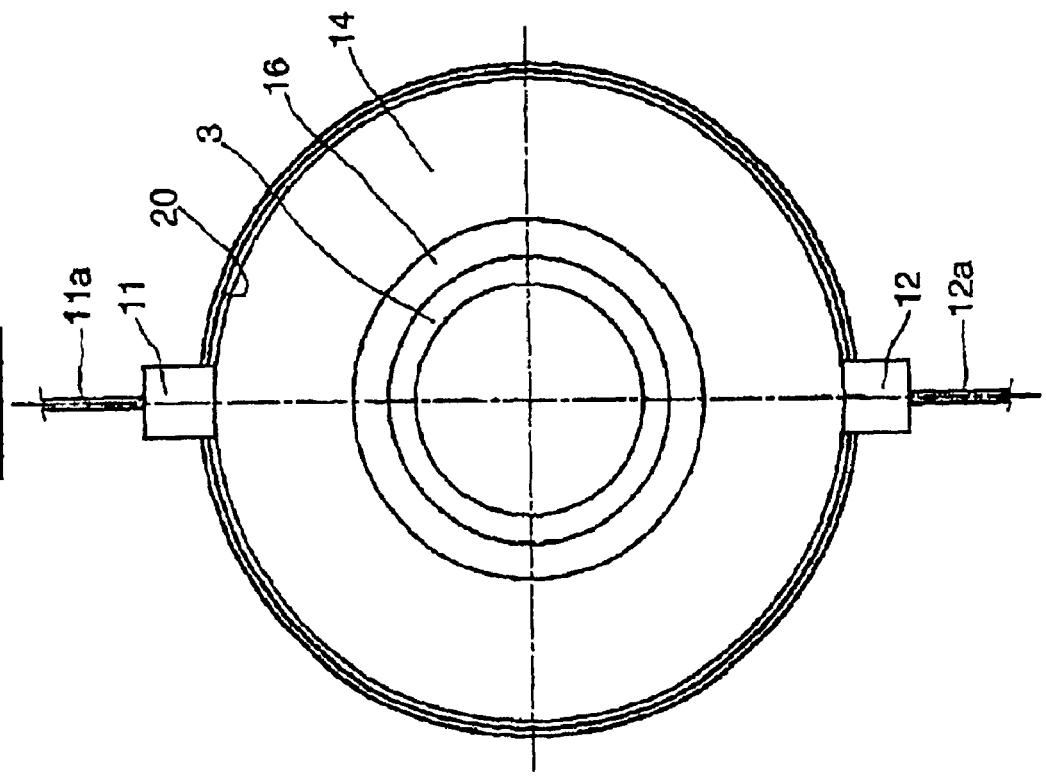
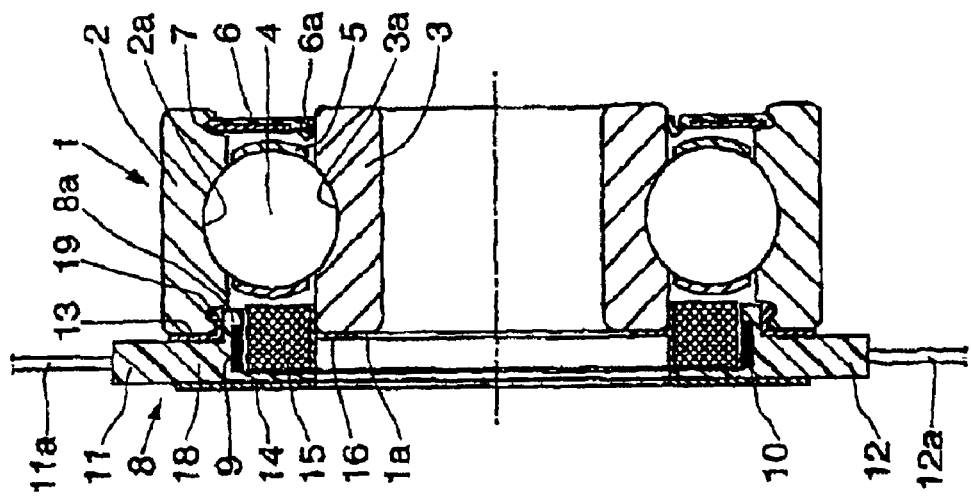

DEVICE FOR DETECTING ANGULAR DISPLACEMENT AND INSTRUMENTED ROLLER BEARING

The present invention relates to the field of the detection of one or several angular displacement parameters pertaining to a rotary member using an instrumented rolling bearing, that is to say one which has an information sensor block capable, in collaboration with an encoder element, of providing signals representing information relating to angular displacement, for example the displacement angle, the speed, the direction of rotation, of the rotary member.

Such instrumented rolling bearings are used in many applications, among which mention may more particularly be made of devices for controlling the orientation of the wheels of land vehicles such as touring cars, handling vehicles, civil engineering works vehicles, etc. Instrumented rolling bearings of this type are also used wherever there is a need, in a motor vehicle, to determine one or more parameters associated with the rotation of one of the wheels, of a member of the transmission or of the steering of the motor vehicle.

Instrumented rolling bearings generally comprise a sensor block mounted on the non-rotating ring of the bearing and an encoder ring mounted on the rotating ring and, during rotation, moving past a detection element comprising one or more sensors housed in the sensor block. The encoder ring may, for example, be of the multi-pole magnetic type. The sensor or sensors may be of the magnetically sensitive type as is the case, for example, of Hall-effect probes.

Use may also be made, in these instrumented rolling bearings, of a detection assembly comprising a sensor and an encoder of an optical type.

In general, the movement of the encoder past the detection element generates in the latter a signal representative of one or more parameters pertaining to the angular displacement of the encoder. From this, after appropriate processing of the signal, information relating to the angular displacement that is to be detected can be deduced, whether this be the angle of displacement, the angular speed, the direction of travel or any other parameter. For this purpose, the signal emitted is transmitted to a processing and operating unit by a set of connections generally comprising a cable leaving the sensor block of the instrumented rolling bearing via a wire terminal. The cable ends, for example, in a connector capable of transmitting the signal to the processing and operating unit.

In certain applications, absolute dependability and infallible detection of the desired parameter is demanded.

German patent application DE 195 10717 conceived of arranging two detection systems mounted on two separate rolling bearings.

Patent application EP 0 921 399 also conceived of arranging two identical detection elements on each side of the same rolling bearing, these elements each collaborating with its own encoder ring, each detection element transmitting its own information signals independently of one another to an electronic unit where the signal was processed and used.

While in this case an improvement in the dependability of the system is indeed achieved, since one of the detection elements is able, should the other malfunction, to palliate this failure, it is nonetheless found that there is a significant increase in the axial bulk of the instrumented rolling bearing thus equipped.

French patent application 2 558 223 describes the use, in an instrumented rolling bearing, of two sensors mounted on the same side of the rolling bearing on the same support, each sensor collaborating with its own encoder ring.

All these devices entail the use of two encoder rings, and this increases the cost price of the assembly accordingly.

The fact of using two separate encoders and independent sensor blocks also complicates the operations of indexing the encoder and the sensor with respect to a reference mark associated angularly with the encoder when the type of information detected or the application dictates such indexing.

Patent application EP-0 814 338 describes an orientation ring comprising, on the external frontal surface of the non-rotating ring, a magnetic synthetic strip bonded into a peripheral groove after cutting to the right length and acting as an encoder.

That document explains that a small region of groove not equipped with encoder may remain in that it is very difficult indeed to make the two ends of the magnetic strip meet. To avoid the resulting perturbations in the measurement, the document anticipates equipping the outer ring with two sensors inserted in a radial plane via through-holes made in the rotating ring.

Such a structure is complex because it entails providing two through-holes for the two sensors. In addition, the second sensor is intended to avoid the perturbations in the measurement resulting from the cut there is between the non-contiguous ends of the encoder strip. In the event of one of the encoders failing, the measurement remains perturbed.

The invention therefore proposes to eliminate these drawbacks by means of a detection device and an instrumented rolling bearing which ensure perfectly dependable detection of one or more parameters while at the same time being compact and inexpensive.

The device for detecting one or more angular displacement parameters pertaining to a rotary member, according to one embodiment of the invention, comprises an instrumented rolling bearing of the type provided with a non-rotating part comprising a non-rotating ring and a sensor block mounted on one face of the non-rotating ring, with a rotating part comprising a rotating ring and an encoder ring mounted facing the sensor block and with at least one row of rolling bodies arranged between two raceways of the non-rotating and rotating rings. Means for processing signals emitted by the sensor block are also provided. The single sensor block comprises at least two detection elements collaborating with the single encoder ring. Signals emitted independently by each detection element correspond to the same angular-displacement parameter, so as to provide the processing means with redundant information about said angular displacement parameter.

According to the invention, the single encoder is produced in the form of a continuous ring mounted in the rolling bearing in such a way as to ensure continuity of the signal.

The detection elements are advantageously mounted in a single sensor block arranged on just one side of the rolling bearing so as to reduce the overall bulk and make it simpler to manufacture.

In an advantageous embodiment, two detection elements are arranged diametrically opposed.

Each detection element preferably comprises at least one sensor.

Each detection element is preferably connected to the signal-processing means by an independent connection assembly.

The detection elements, thus being completely independent of one another, ensure a perfectly redundant system. If one of the detection elements becomes defective for one reason or another, another detection element is capable of fully taking its place.

The invention will be better understood from studying the detailed description of a particular embodiment which is described by way of entirely nonlimiting example and illustrated by the appended drawings, in which:

FIG. 1 is a sectioned view of an instrumented rolling bearing taken on I—I of FIG. 2; and FIG. 2 is an external side view of the instrumented rolling bearing of FIG. 1.

As illustrated in the figures, the instrumented rolling bearing referenced 1 in its entirety comprises a non-rotating ring 2 equipped with a raceway 2a and a non-rotating ring 3 equipped with a raceway 3a. A plurality of balls 4 are mounted between the rings 2 and 3 so as to roll along the raceways 2a, 3a, held at an appropriate circumferential spacing by a cage 5 made, for example, of a synthetic material. On one of the front faces of the bearing 1, sealing is afforded by a sealing ring 6 having an annular lip 6a in rubbing contact with the exterior cylindrical surface of the rotating ring 3, the sealing ring 6 being mounted in an annular groove 7 of the non-rotating ring 2.

Mounted on the opposite front face of the bearing 1 is a single sensor block referenced 8 in its entirety. In the example illustrated, the sensor block 8 comprises two detection elements 9, 10 arranged diametrically opposed and each embedded in the synthetic material of which the sensor block 8 is made. Each detection element is associated with a wire ending 11, 12 in the form of a radial protrusion for the attachment of a cable 11a, 12a via which a signal emitted may be transmitted to an electronic unit for processing and using the signal, which unit is not depicted in the figures. Each signal emitted by one detection element is completely independent of the signal emitted by the other detection element.

The sensor block 8 is fixed to the front face of the non-rotating ring 2 by means of a fixing support 13 inserted between the non-rotating ring 2 and the sensor block 8, both on the radial parts and on the circumferential parts and a free end of which is bent into a groove 19 symmetric with the groove 7.

A cylindrical annular portion 8a is inserted inside the bore of the non-rotating ring 2 appreciably level with the groove 19 in the axial direction, so that the detection elements 9, 10 can be arranged partially between the two rings 2 and 3.

An external protective plate 14 is also fixed on the outside of the sensor block 8 by crimping performed by knocking the other free end 20 of the support 13 over onto the periphery of the external protective plate 14.

The two detection elements 11, 12 are spread on the same side of the rolling bearing 1. For this, the sensor block 8 is mounted on one of the front faces of the bearing 1 via the support 13.

The two detection elements 9, 10 are completely independent of one another as far as signal processing is concerned and each collaborates with a single encoder ring 15 mounted facing the sensor block 8 on the external cylindrical surface of the rotating ring 3 so as to be rotated thereby. The ring 15 constitutes a continuous magnetic surface with no break in continuity in the circumferential direction. The encoder ring 15 is mounted by means of a support 16 which is housed partly between the rings 2 and 3 of the bearing 1. The support 16, with a T-section, is pushed onto the exterior cylindrical surface of the rotating ring 3 and comes into abutment against the front surface 1a thereof. A portion of the encoder ring 15 thus lies between the rings 2 and 3 and a portion projects outward. Most of the exterior cylindrical surface of the encoder ring 15 lying facing the two detection elements 9, 10 with a small air gap.

It will of course be understood that it is possible to arrange the two detection elements 9, 10 in different positions. It is not compulsory for them to be arranged diametrically opposed. Likewise, it is possible to anticipate using more than two detection elements so as to increase the redundancy of the entire system still further, the essential factor always being that the detection elements all be integrated into the single sensor block 8.

The two detection elements 9, 10 of the sensor block are each intended to determine the value of at least one parameter regarding the angular displacement of the encoder ring 15. Each of the detection elements 9, 10 operates independently of one another and thus contributes to supplying redundant information regarding at least one of said angular displacement parameters. If one of the detection elements becomes faulty, the other can be substituted fully for it.

The fact that all the detection elements collaborate with a single encoder ring 15 makes it possible to obtain a particularly economical device without in any way detracting from the dependability of the system, any failures that are found in practice in fact originating essentially from the sensors or their connections.

The whole device is no more bulky, axially, than an instrumented rolling bearing device of conventional type comprising a single detection element and a single wire terminal and is of low mass.

In addition, given that use is made of a single encoder ring and a relative angular position between the various detection elements of the single sensor block which position is predefined by construction, any indexing of the encoder with respect to the detection elements can be done easily in a single operation for all the detection elements.

Finally, as may be seen, the rolling bearing used is of standard type and requires no special-purpose machining by comparison with a mass-produced rolling bearing.

What is claimed is:

1. A device for detecting one or more angular displacement parameters pertaining to a rotary member, comprising: an instrumented rolling bearing (1) of the type provided with a non-rotating part comprising a non-rotating ring (3) and a sensor block (8) mounted on one face of the non-rotating ring, with a rotating part comprising a rotating ring (2) and an encoder ring (15) mounted facing the sensor block and with at least one row of rolling bodies (4) arranged between two raceways of the non-rotating and rotating rings; and means for processing signals emitted by the sensor block, wherein the single sensor block comprises at least two detection elements (9, 10) collaborating with the single encoder ring, signals emitted independently by each detection element corresponding to the same angular-displacement parameter, so as to provide the processing means with redundant information about said angular displacement parameter.

2. The detection device as claimed in claim 1, wherein it comprises two detection elements arranged diametrically opposed.

3. The detection device as claimed in claim 2, wherein each detection element comprises at least one sensor.

4. The detection device as claimed in claim 3, wherein each detection element is connected to the signal-processing means by an independent connection assembly.

5. The detection device as claimed in claim 2, wherein each detection element is connected to the signal-processing means by an independent connection assembly.

6. The detection device as claimed in claim 1, wherein each detection element comprises at least one sensor.

7. The detection device as claimed in claim 6, wherein each detection element is connected to the signal-processing means by an independent connection assembly.

8. The detection device as claimed in claim 1, wherein each detection element is connected to the signal-processing means by an independent connection assembly.

9. An instrumented rolling bearing (1) intended to detect one or several angular displacement parameters pertaining to a rotary member, of the type provided with a non-rotating part comprising a non-rotating ring (3) and a sensor block (8) mounted on one face of the non-rotating ring, with a rotating part comprising a rotating ring (2) and an encoder ring (15) mounted facing the sensor block and with at least one row of rolling bodies (4) arranged between two raceways of the non-rotating and rotating rings; wherein the single sensor block comprises at least two detection elements (9, 10) collaborating with the single encoder ring, signals emitted independently by each detection element corresponding to the same angular-displacement parameter, so as to provide the processing means with redundant information about said angular displacement parameter.

10. The instrumented rolling bearing as claimed in claim 9, wherein it comprises two detection elements arranged diametrically opposed.

11. The instrumented rolling bearing as claimed in claim 10, wherein each detection element comprises at least one sensor.

12. The instrumented rolling bearing as claimed in claim 11, wherein each detection element is connected to an independent connection assembly.

13. The instrumented rolling bearing as claimed in claim 10, wherein each detection element is connected to an independent connection assembly.

14. The instrumented rolling bearing as claimed in claim 9, wherein each detection element comprises at least one sensor.

15. The instrumented rolling bearing as claimed in claim 14, wherein each detection element is connected to an independent connection assembly.

16. The instrumented rolling bearing as claimed in claim 9, wherein each detection element is connected to an independent connection assembly.

* * * * *